(12) United States Patent
Wright et al.

(10) Patent No.: US 12,373,332 B2
(45) Date of Patent: Jul. 29, 2025

(54) SYSTEMS AND METHODS FOR FACILITATING SOFTWARE VALIDATION WITHIN A PRODUCTION ENVIRONMENT

(71) Applicant: MASTERCONTROL, INC., Salt Lake City, UT (US)

(72) Inventors: Erin Marie Wright, Philadelphia, PA (US); Mike Lowell Hunter, Heber City, UT (US); Kimberly Erin Jackson, Midvale, UT (US); Kevin Russell Ballard, Saratoga Springs, UT (US); Chad Milito, Ogden, UT (US)

(73) Assignee: MASTERCONTROL SOLUTIONS, INC., Salt Lake City, UT (US)

( * ) Notice: Subject to any disclaimer, the term of this patent is extended or adjusted under 35 U.S.C. 154(b) by 331 days.

(21) Appl. No.: 17/469,632

(22) Filed: Sep. 8, 2021

(65) Prior Publication Data

US 2022/0091966 A1    Mar. 24, 2022

Related U.S. Application Data

(60) Provisional application No. 63/081,832, filed on Sep. 22, 2020.

(51) Int. Cl.
*G06F 11/3698* (2025.01)
*G06F 11/3668* (2025.01)

(52) U.S. Cl.
CPC ...... *G06F 11/3698* (2025.01); *G06F 11/3684* (2013.01); *G06F 11/3688* (2013.01)

(58) Field of Classification Search
CPC ....... G06F 11/36–3696; G06F 11/3698; G05B 23/00–0297
See application file for complete search history.

(56) References Cited

U.S. PATENT DOCUMENTS

| | | | | |
|---|---|---|---|---|
| 7,069,541 | B2 * | 6/2006 | Dougherty | G06F 8/20 |
| | | | | 717/124 |
| 7,124,401 | B2 * | 10/2006 | Muller | G06F 11/3664 |
| | | | | 717/124 |
| 9,298,590 | B2 * | 3/2016 | Kim | G06F 11/3688 |
| 11,210,203 | B2 * | 12/2021 | Jin | G06F 11/3664 |
| 2004/0044993 | A1 * | 3/2004 | Muller | G06F 11/3684 |
| | | | | 717/124 |

(Continued)

*Primary Examiner* — Todd Aguilera
(74) *Attorney, Agent, or Firm* — Workman Nydegger

(57) ABSTRACT

A production system is configurable to obtain a set of computer-executable instructions that are operable to cause the production system to perform a set of workflow steps. The production system is also configurable to obtain implementation data associated with the set of workflow steps and identify a set of synthetic execution indicators associated with the set of workflow steps. The production system is configurable to (1) generate a validation test based on the implementation data, the set of synthetic execution indicators, and the set of workflow steps, and (2) perform the validation test by synthetically executing the one or more workflow steps on the production system using inputs generated from the implementation data, recording synthetic execution output in a synthetic execution data repository, and refraining from recording the synthetic execution output as production transaction output on a production transaction data repository.

18 Claims, 4 Drawing Sheets

(56) References Cited

U.S. PATENT DOCUMENTS

| | | | |
|---|---|---|---|
| 2004/0261053 A1* | 12/2004 | Dougherty | G06F 8/20 |
| | | | 717/101 |
| 2015/0378872 A1* | 12/2015 | Kim | G06F 11/3688 |
| | | | 717/124 |
| 2019/0251018 A1* | 8/2019 | Jin | G06F 11/3692 |
| 2021/0141719 A1* | 5/2021 | Anastasiou | G06F 11/3696 |
| 2021/0191845 A1* | 6/2021 | Bach | G06F 11/3684 |

* cited by examiner

Validation Test Report 300

CAPA Report Validation Results 305

Approve? ○ Reject? ● ⌒360A

Discrepancies 315

| Input 320 | Expected Output 325 | Actual Output 330 |
|---|---|---|
| Responsible Entities: Department = Process Control | mailto: (User Type = Process Manager) (Users = Jane Doe, Janet Doe, Janice Doe) | mailto: (User Type = Process Engineer) (User = John Doe) |
| Input 335 | Expected Output 340 | Actual Output 345 |
| Responsible Entity: Department = Environmental Safety | mailto: (User Type= Impact Manager) (User = Jane Smith, Janet Smith, Janice Smith) | mailto: (User Type = Financial Manager) (User = John Smith) |

....⌒350

Deviation Report Validation Results 310

Approve? ● Reject? ○ ⌒360B

No Discrepancies Found

SYSTEMS AND METHODS FOR FACILITATING SOFTWARE VALIDATION WITHIN A PRODUCTION ENVIRONMENT

CROSS-REFERENCE TO RELATED APPLICATION

This application claims the benefit of U.S. Provisional Application No. 63/081,832, filed Sep. 22, 2020, the entire contents of which are herein incorporated by reference.

BACKGROUND

Various governments exert regulatory control over companies within their jurisdictions. For instance, in some jurisdictions, pharmaceutical companies and manufacturers, medical device makers, and/or clinical research organizations are subject to compliance regulations. By way of example, software applications used by such entities to generate, transmit, and/or otherwise manage certain electronic records may be subject to government regulations related to software validation before commercial implementation (e.g., according to 21 C.F.R. part 11). Software validation may comprise performing testing and/or verification procedures on a version of a software application to ensure that the software application meets specifications and/or fulfills its intended purpose.

Software validation in accordance with governmental regulations is often a burdensome and/or costly hurdle for regulated entities. Conventional approaches for software validation include building and configuring an entire version of a software application for use in a production environment, moving the software application to a testing environment that emulates the production environment, and performing validation testing within the testing environment to ensure compliant functioning of all aspects of the software application. However, such validation procedures are time-intensive and often result in superfluous validation processing on aspects of the software application that are not subject to government regulation. In addition, establishing and/or maintaining a testing environment that accurately mirrors a production environment is often a computationally expensive undertaking.

Furthermore, although conventional validation techniques may provide a validated version of a software application, subsequent changing, updating, and/or reconfiguring of the validated version of the software application may require validation of aspects of the changed, updated, and/or reconfigured version of the software application. However, even where only a portion of a software application becomes changed, updated, and/or reconfigured, entities often resort to revalidating all aspects of the altered software application under conventional validation techniques described above, which may also result in superfluous validation processing.

For at least the foregoing reasons, there is an ongoing need and desire for improved software validation techniques.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Implementations of the present disclosure extend to systems, methods, and devices for facilitating software validation within a production environment.

Some embodiments include computer-executable instructions that are executable by one or more processors of a production system to configure the production system to perform various acts associated with facilitating software validation within a production environment. In some implementations, a production system is configurable to obtain a set of computer-executable instructions configured to cause the production system to perform a set of workflow steps to generate production transaction output for storage on a production transaction data repository. The production system is further configurable to obtain implementation data associated with the set of workflow steps. The production system is furthermore configurable to identify a set of synthetic execution indicators associated with the set of workflow steps. The set of synthetic execution indicators indicate one or more workflow steps of the set of workflow steps that require validation.

The production system is also configurable to generate a validation test based on the implementation data, the set of synthetic execution indicators, and the set of workflow steps. In addition, the production system is configurable to perform the validation test for the set of workflow steps. In some instances, performing the validation test comprises synthetically executing the one or more workflow steps of the set of workflow steps on the production system using inputs generated from the implementation data, recording synthetic execution output generated by synthetically executing the one or more workflow steps in a synthetic execution data repository, and refraining from recording the synthetic execution output as production transaction output on the production transaction data repository.

Some embodiments include methods associated with facilitating software validation within a production environment. In some implementations, a method includes obtaining a set of computer-executable instructions configured to cause a production system to perform a set of workflow steps to generate production transaction output for storage on a production transaction data repository. The method further includes obtaining implementation data associated with the set of workflow steps. The method also includes identifying a set of synthetic execution indicators associated with the set of workflow steps. The set of synthetic execution indicators indicates one or more workflow steps of the set of workflow steps that require validation.

The method furthermore includes generating a validation test based on the implementation data, the set of synthetic execution indicators, and the set of workflow steps. The method additionally includes performing the validation test for the set of workflow steps. In some instances, performing the validation test comprises synthetically executing the one or more workflow steps of the set of workflow steps on the production system using inputs generated from the implementation data, recording synthetic execution output generated by synthetically executing the one or more workflow steps in a synthetic execution data repository, and refraining from recording the synthetic execution output as production transaction output on the production transaction data repository.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings.

FIG. 3 illustrates an example conceptual representation of a validation test report, according to implementations of the present disclosure.

DETAILED DESCRIPTION

Figure 1:
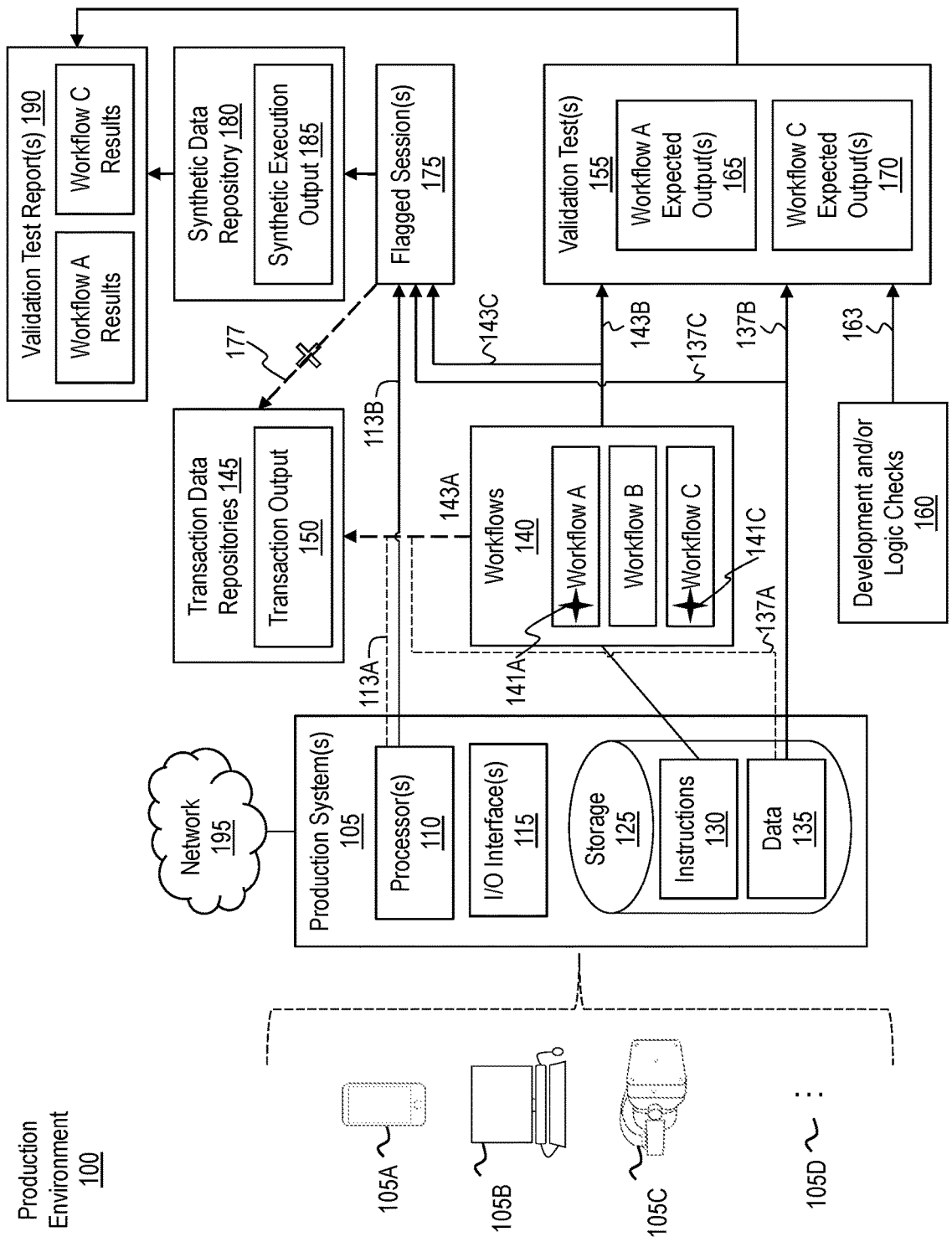
FIG. 1 illustrates an example conceptual representation of a production system operating within a production environment that may comprise or be used to implement the disclosed principles.

Implementations of the present disclosure extend to systems, methods, and devices for facilitating software validation within a production environment. For example, a system, method, or device for facilitating software validation within a production environment may be associated with the performance of, or being configurable to perform, various acts. In some implementations, the acts include obtaining a set of computer-executable instructions configured to cause a production system to perform a set of workflow steps to generate production transaction output for storage on a production transaction data repository. The acts may further include obtaining implementation data associated with the set of workflow steps. The acts may also include identifying a set of synthetic execution indicators associated with the set of workflow steps. The set of synthetic execution indicators indicates one or more workflow steps of the set of workflow steps that require validation.

Furthermore, the acts may include generating a validation test based on the implementation data, the set of synthetic execution indicators, and the set of workflow steps. The acts may additionally include performing the validation test for the set of workflow steps. In some instances, performing the validation test comprises synthetically executing the one or more workflow steps of the set of workflow steps on the production system using inputs generated from the implementation data, recording synthetic execution output generated by synthetically executing the one or more workflow steps in a synthetic execution data repository, and refraining from recording the synthetic execution output as production transaction output on the production transaction data repository.

Those skilled in the art will recognize, in view of the present disclosure, that at least some of the disclosed embodiments may be implemented to address various shortcomings associated with conventional approaches to software validation (e.g., to comply with government regulations).

For example, at least some implementations of the present disclosure enable entities to select portions of a software application for validation (e.g., particular workflows), rather than requiring entities to validate all aspects of a software application (e.g., according to at least some conventional techniques). In this regard, at least some implementations of the present disclosure facilitate software validation in a focused manner in which validation is performed on regulated and/or critical aspects of the software application (e.g., aspects by an entity) and in which validation is omitted for unregulated and/or noncritical aspects of the software application (e.g., aspects not selected by the entity).

Relatedly, at least some implementations of the present disclosure enable entities to focus revalidation processing for a changed, updated, and/or reconfigured software application on the portions of the software application that were changed, updated, and/or reconfigured. In this regard, at least some implementations of the present disclosure refrain from unnecessarily revalidating all aspects of a changed, updated, and/or reconfigured software application, especially portions of the software application that were not changed, updated, and/or reconfigured.

Furthermore, at least some implementations of the present disclosure facilitate software validation within a production environment, rather than a testing environment. As used herein, a "production environment" refers to a setting where a software application is put into operation for its intended purpose by end users (e.g., to facilitate commercial and/or business transactions and/or operations). In contrast, a "testing environment" comprises a non-production environment that attempts to simulate a production environment in order to test how a particular aspect of a software application would operate within the simulated production environment. At least some implementations of the present disclosure do not use testing environments and allow entities to avoid the computationally costly maintenance of testing environments that accurately mirror production environments in order to facilitate software validation.

Accordingly, at least some implementations of the present disclosure facilitate software validation in an agile, dynamic, timely, and/or efficient manner. For example, software validation may be appended or implemented into configuration procedures for configuring or reconfiguring/updating a software application (whether previously validated or not). Thus, at least some implementations of the present disclosure may be regarded as providing self-validating software.

Having described some of the various high-level features and benefits of the disclosed embodiments, attention will now be directed to FIGS. 1 through 4. These Figures illustrate various conceptual representations, architectures, methods, and/or supporting illustrations related to the disclosed embodiments.

FIG. 1 illustrates an example conceptual representation of production system(s) 105 operating within a production environment 100 that may comprise or be used to implement the principles disclosed herein. As noted hereinabove, a production environment 100 comprises a setting where a software application is put into operation for its intended purpose by end users (e.g., to facilitate commercial and/or business transactions and/or operations). Accordingly, for a particular business or entity, a production environment 100 may comprise production system(s) 105 configured in communication with the entity-specific devices and/or sites utilized for carrying out entity-specific business and/or commercial purposes.

The production system(s) 105 may take on various different forms. For example, the production system(s) 105 may be embodied as one or more tablets, desktops, laptops, mobile devices, cloud devices, head-mounted displays, and/or other devices. The production system(s) 105 may also comprise one or more distributed systems that include one or more connected computing components/devices that are in communication. FIG. 1 specifically depicts that the production system(s) 105 may comprise tablets 105A, laptops 105B, and/or head-mounted displays 105C, but the ellipsis 105D indicates that the production system(s) 105 may be embodied in other forms as well.

The production system(s) 105 illustrated in FIG. 1 comprise processor(s) 110, I/O interface(s) 115, and storage 125. The processor(s) 110 may comprise one or more sets of electronic circuitry that include any number of logic units, registers, and/or control units to facilitate the execution of computer-readable instructions (e.g., instructions that form a computer program). Such computer-readable instructions (represented in FIG. 1 as instructions 130) may be stored within the storage 125 of the production system(s) 105. The storage 125 may comprise physical system memory, which may be volatile, non-volatile, or some combination thereof. Additional details related to processor (e.g., processor(s) 110) and computer storage media (e.g., storage 125) will be provided hereinafter.

In some instances, the instructions 130 are operable, when executed by the processor(s) 110, to cause the production system(s) 105 to perform or execute one or more workflows 140, which may comprise various workflow steps. By way of example, a workflow may facilitate an at least partially interactive user experience at the production system(s) (e.g., via I/O interfaces 115, which may comprise displays, touch screens, a mouse, a keyboard, a controller, and/or other devices). Executing a workflow may comprise presenting prompts for user input throughout various workflow steps and generating and/or providing output based on the user input to carry out a particular task or process associated with the workflow.

The instructions 130 may be operable to cause the production system(s) to perform various different workflows 140 for different purposes, indicated in FIG. 1 as Workflow A, Workflow B, and Workflow C. By way of non-limiting example, Workflow A may be associated with facilitating a corrective and preventive action (CAPA) (e.g., generating a CAPA report), Workflow B may be associated with generating a time off request, and Workflow C may be associated with generating a deviation report. One will appreciate that the number and character of workflows described above is illustrative only, and the instructions 130 may be operable to cause the production system(s) 105 to carry out any number and/or type of workflows 140.

The production system(s) 105 may be configured to carry out the workflows 140 using entity-specific data, represented in FIG. 1 as data 135. The data 135 may specify parameters and/or settings for carrying out the workflows 140. For example, the data 135 may comprise one or more configurations that specify which workflow steps or acts to enable, the formatting of the workflow steps, and/or how to respond to user input when executing a workflow within the production environment 100.

In another example, the data 135 may comprise or map to an active directory of users and their roles within an organization associated with the production system(s). The active directory may be used when carrying out workflows 140 in various ways. By way of illustrative example, Workflow B for generating a time off request may include a workflow step configured to prompt a user to indicate their department within an organization, and the selections provided may be derived from the active directory. Continuing with the above example, Workflow B may be configured to identify a user's supervisor based on the user's selection of their department within the organization by consulting the active directory (e.g., by identifying users within the appropriate department associated with the user type "supervisor"). The data 135 may also comprise or map to other devices and/or data structures within the production environment 100.

As used herein, "workflow steps" may refer to one or more particular prompts, tasks, and/or actions associated with one or more workflows, or may refer to one or more entire workflows.

FIG. 1 illustrates a dashed arrow 143A extending from the workflows 140 to a transaction data repository 145, a dashed arrow 113A extending from the processor(s) 110 to dashed arrow 143A, and a dashed arrow 137A extending from data 135 to dashed arrow 143A. The dashed arrows noted above indicate that the instructions 130 are operable to cause the production system(s) 105 to perform the workflows 140 based on the data 135 (e.g., organization-specific data) within the production environment 100 when executed by the processor(s) 110. Performing the workflows 140 may generate transaction output 150 (e.g., CAPA reports according to Workflow A, time off requests according to Workflow B, deviation reports according to Workflow C), and the transaction output 150 may become stored within one or more transaction data repositories 145 or other destinations within the production environment 100.

It should be noted that, in some instances, the transaction data repositories 145 form a part or partition of storage 125, and the transaction output 150 may become stored within the transaction data repositories 145 temporarily (e.g., the transaction data repositories 145 may comprise volatile memory).

Thus, the production system(s) 105 may be operable to carry out one or more of the workflows 140 to perform organization-or entity-specific functionality and to cause real production consequences within the production environment 100. For example, executing Workflow A may cause a CAPA report to be generated and/or sent to a user of an organization, executing Workflow B may cause a time off request to be generated and/or sent to a user of an organization, and executing Workflow C may cause a deviation report to be generated and/or sent to a user of an organization.

However, as indicated above for regulated entities or organizations, at least some workflows that are executable on production system(s) 105 may be subject to government regulations that require software validation before becoming enabled for use in a commercial or business context (e.g., within production environment 100). Thus, as will be described in more detail hereinbelow, at least some implementations of the present disclosure provide agile techniques for validating specific workflows prior to enablement for execution on production system(s) 105 within a production environment 100.

Figure 2:
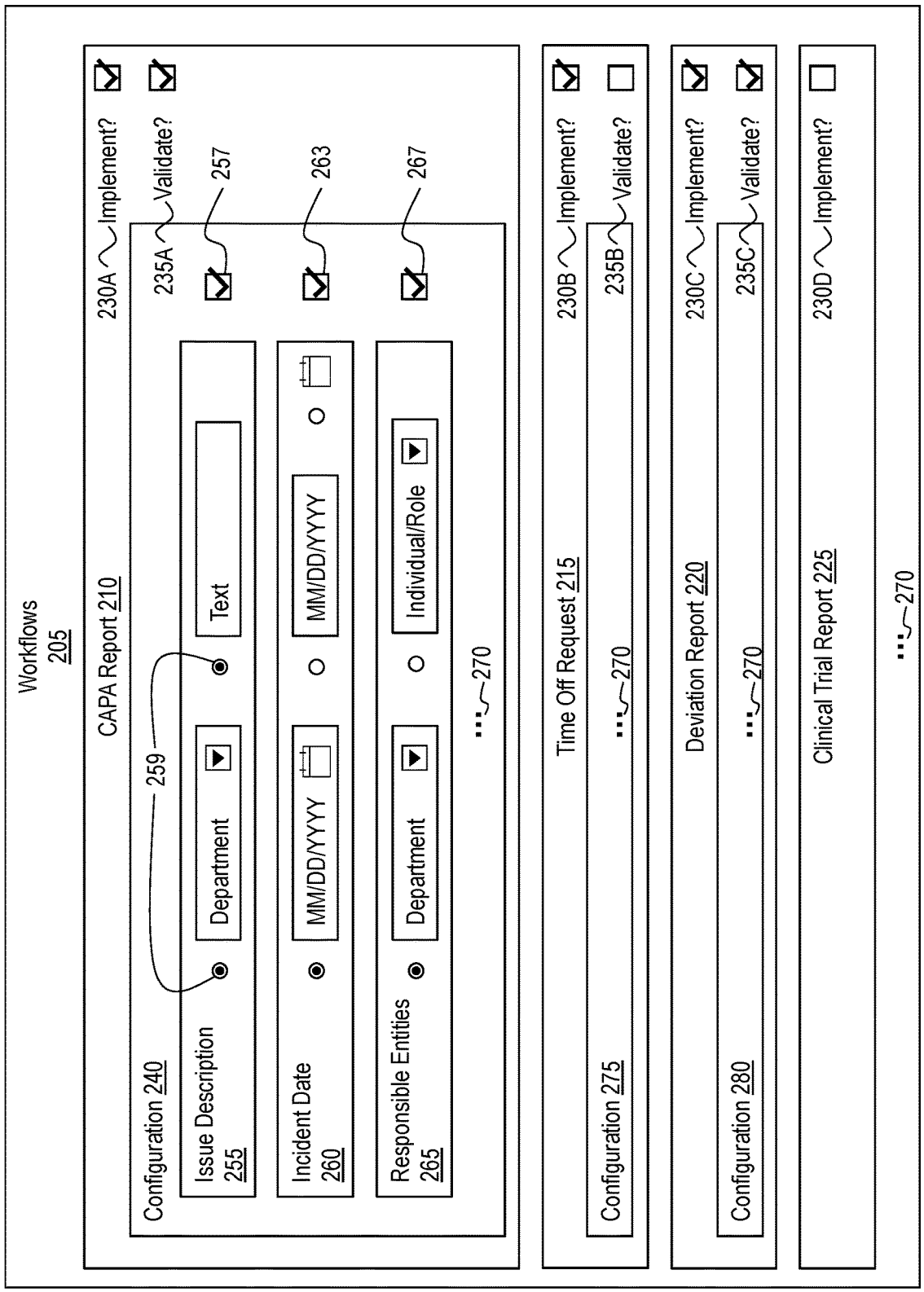
FIG. 2 illustrates an example conceptual representation of a user interface configured to facilitate selection and/or configuration of workflows for implementation and/or validation within a production environment.

In some instances, such validation techniques are implemented into processes for initially configuring or reconfiguring/updating/changing the workflows 140. For example, in some instances, an organization or entity receives a software program or package from a software developer. The software program may include various features (e.g., various workflows) that the organization may enable and/or configure with organization-specific implementation data in order to fit the business needs of the organization. FIG. 2 illustrates an example conceptual representation of a user interface configured to facilitate selection and/or configuration of workflows 205 for implementation and/or validation within a production environment 100. By way of example, the workflows 205 of FIG. 2 at least partially correspond to the workflows 140 described hereinabove with reference to FIG. 1. For example, CAPA report workflow 210 of workflows 205 corresponds to Workflow A of workflows 140, time off request workflow 215 of workflows 205 corresponds to Workflow B of workflows 140, and deviation report workflow 220 of workflows 205 corresponds to Workflow C of workflows 140.

FIG. 2 depicts that, in some instances, an entity may provide user input that indicates which workflows 205 to implement for execution on production system(s) 105 within a production environment 100 associated with the entity. For example, FIG. 2 illustrates prompts 230A, 230B, 230C, and 230D associated with the various workflows 205. The prompts 230A, 230B, 230C, and 230D comprise a checkable box in association with an "Implement?" inquiry, whereby a user may provide input (e.g., checking the box) to select which workflows of the workflows 205 the entity or organization desires to implement for execution within production environment 100 associated with the entity or organization. In the example shown in FIG. 2, workflows 210, 215, and 220 are selected for implementation within the production environment 100, according to prompts 230A, 230B, and 230C, respectively. Workflows 140 of FIG. 1 also correspond to this example selection, in particular because Workflow A, Workflow B, and Workflow C (which correspond to workflows 210, 215, and 220, respectively) are represented as part of the workflows 140 of FIG. 1.

In contrast, FIG. 2 shows that prompt 230D associated with workflow 225 for generating a clinical trial report indicates non-selection of workflow 225 for implementation within the production environment 100. Workflows 140 of FIG. 1 also correspond to this example non-selection, in particular because workflows 140 of FIG. 1 omit a workflow that corresponds to generating a clinical trial report according to workflow 225 of FIG. 2.

FIG. 2 also depicts that, in some instances, an entity may provide user input that indicates which workflows 205 are to be validated prior to enablement for execution by production system(s) 105 within the production environment 100 (e.g., to generate transaction output 150 for storage in one or more transaction data repositories 145). For example, FIG. 2 illustrates prompts 235A, 235B, and 235C associated with workflows 210, 215, and 220, respectively. The prompts 235A, 235B, and 235C comprise a checkable box in association with a "Validate?" inquiry, whereby a user may provide input (e.g., checking the box) to select which workflows of the workflows 205 the entity or organization desires to validate prior to enablement for execution within production environment 100 associated with the entity or organization. In the example shown in FIG. 2, workflows 210 and 220 are selected for validation according to prompts 235A and 235C, respectively. In contrast, FIG. 2 shows that prompt 235B associated with workflow 215 for generating a time off request indicates non-selection of workflow 215 for validation.

FIG. 2 furthermore illustrates that, in some instances, an entity or organization may configure one or more of the workflows 205 in order to tailor the workflows 205 to the particular needs of the entity or organization. For example, FIG. 2 depicts configuration 240 associated with workflow 210 for generating a CAPA report.

In some implementations, configuration 240 of FIG. 2 provides the ability to establish, select, and/or modify which workflow steps to include when executing the workflow 210 within the production environment 100. For example, FIG. 2 illustrates various workflow steps associated with generating a CAPA report according to workflow 210, including workflow step 255 (for obtaining an issue description), workflow step 260 (for obtaining an incident date), and workflow step 265 (for identifying responsible entities). FIG. 2 also illustrates prompts 257, 263, and 267 associated with workflow steps 255, 260, and 265, respectively. The prompts 257, 263, and 267 comprise selectable boxes that allow selective inclusion or omission of particular workflow steps (e.g., workflow steps 255, 260, 265) while executing workflow 210 within a production environment 100.

In addition, in some implementations, configuration 240 of FIG. 2 demonstrates that an organization or entity may establish settings and/or parameters for execution of the workflow 210 on production system(s) 105 within the production environment 100. For example, FIG. 2 depicts workflow step 255 in association with user input elements that may be selected (e.g., by selectable buttons 259) for inclusion when obtaining user input for an issue description, such as a text field and a drop-down menu for selecting a company department. FIG. 2 shows an example in which both the selectable buttons 259 for the drop-down menu and the text field are selected, such that, when workflow step 255 is performed within the production environment 100, both the drop-down menu and the text field will be presented as user prompts to obtain an issue description.

Furthermore, by way of example, FIG. 2 also depicts workflow step 260 in association with selectable buttons (e.g., similar to selectable buttons 259) for selecting from among different formats for obtaining an incident date, such as a date text field, a calendar icon for activating a date selection interface, or a combination of the two. FIG. 2 shows an example in which a selectable button associated with a combination of both a calendar icon and a date text field is selected, such that, when workflow step 260 is performed within the production environment 100, the combination of the calendar icon and the date text field will be presented as a user prompt to obtain an incident date.

Also, by way of example, FIG. 2 depicts workflow step 265 in association with selectable buttons (e.g., similar to selectable buttons 259) for selecting from among different formats for obtaining responsible entities, such as a drop-down menu for selecting a responsible department and a drop-down menu for selecting a responsible individual or role. FIG. 2 shows an example in which a selectable button associated with a drop-down menu for selecting a responsible department is selected, such that, when workflow step 265 is performed within the production environment 100, the drop-down menu for selecting a responsible department will be presented as a user prompt to obtain responsible entities. As noted above, a drop-down menu may be configured with or to map to data associated with an active directory of an organization.

The ellipses 270 indicates that additional or alternative sets of workflow steps and/or entire workflows than those shown explicitly in FIG. 2 are within the scope of this disclosure, as well as other forms or types of configuration or other data. FIG. 2 also indicates that the other workflows shown therein may also be configured to fit organization-specific functionality and/or purposes. For instance, FIG. 2 shows configuration 275 for workflow 215 and configuration 280 for workflow 220.

Although FIG. 2 illustrates various configurations within the context of a graphical user interface (e.g., for ease of description), those skilled in the art will recognize, in view of the present disclosure, that an organization or entity may configure a workflow in other ways within the scope of this disclosure (e.g., by editing text in a configuration and/or source code file).

Based on a selection of which workflows to include, which workflow steps to include for the workflows, and/or an indication of which workflows should be validated, the production system(s) 105 may facilitate software validation in a focused, efficient manner prior to enabling the workflows that should be validated for consequential execution within the production environment 100 (e.g., to facilitate out real transactions with real production consequences).

Referring again to FIG. 1, the production system(s) 105 may obtain a set of instructions 130 that are configured to cause the production system(s) 105 to perform or execute workflow steps of a set of workflows 140. As indicated above, the performance of the set of workflow steps by the production system(s) 105 may be operable, in some instances, to generate production transaction output 150 for storage on one or more production transaction data repositories 145 (e.g., causing real, consequential transactions within the production environment). As suggested above, the workflows 140 of the example shown in FIG. 1 may at least partially correspond to the workflows 205 described hereinabove with reference to FIG. 2. Accordingly, the production system(s) 105 may, in some implementations, obtain the computer-executable instructions 130 associated with the workflows 140 based on user input selecting workflows and/or workflow steps associated with the workflows.

FIG. 1 illustrates a synthetic execution indicator 141A associated with Workflow A and a synthetic execution indicator 141C associated with Workflow C. The synthetic execution indicators 141A and 141C indicate that Workflow A and Workflow C are specified as requiring validation (e.g., by an organization or entity associated with production environment 100). For example, Workflow A and Workflow C may be associated with critical, important, and/or regulated aspects of an organizations intended use of the software, such as generating a CAPA report for Workflow A (according to workflow 210 from FIG. 2) or generating a deviation report for Workflow C (according to workflow 220 from FIG. 2). In some instances, the production system(s) 105 identify the synthetic execution indicators 141A, 141C based on user input received in association with one or more workflows or workflow steps (e.g., according to prompts 235A, 235B, and/or 235C from FIG. 2).

As will be described in more detail hereinafter, in some instances, synthetic execution indicators 141A and 141C are operable to cause the production system(s) 105 to perform one or more synthetic executions of Workflow A and Workflow C. A synthetic execution comprises an execution of at least a portion of a software program, such as Workflow A and/or Workflow C, within a production environment 100 that uses inputs generated based on organization-specific data (e.g., data 135, configuration 240 from FIG. 2 for workflow 210 and Workflow A, configuration 280 for workflow 220 and Workflow C) but that results in no real production consequences within the production environment 100. In this regard, a synthetic execution of a workflow within a production environment differs from what may be referred to as "normal" execution of a workflow within a production environment, where a normal execution of a workflow results in real production consequences in the form of transaction output 150 (e.g., CAPA reports, time off requests, deviation reports) becoming stored within transaction data repositories 145, as described hereinabove. For instance, in contrast with a normal execution of a workflow, a synthetic execution of a workflow may generate synthetic execution output 185 (e.g., synthetic CAPA reports, synthetic time off requests, synthetic deviation reports, etc.) for storage within a synthetic data repository 180 (segregated from the transaction data repositories 145), which results in no real production consequences within the production environment.

It will be appreciated, in view of the present disclosure, that synthetic execution indicators 141A, 141C may take on any suitable form for causing synthetic executions, rather than normal executions, of the workflows with which they are associated (e.g., Workflow A and Workflow C). By way of non-limiting example, synthetic execution indicators 141A, 141C may comprise flags, interrupts, code variables, and/or other data elements that are operable to cause the production system(s) 105 to record execution output (e.g., synthetic execution output 185) within a synthetic data repository 180 and refrain from recording execution output (e.g., synthetic execution output 185) within production transaction data repositories 145 (even though the synthetic executions occur within the production environment 100).

Although the present disclosure focuses, in at least some respects, on indicating workflows that deal with government regulated subject matter for validation (e.g., workflows that impact user authentication, data integrity, audit trail, etc.), it should be noted that an entity may choose to validate workflows that are not subject to government regulation for various purposes (e.g., business purposes).

In some instances, the production system(s) 105 generate validation test(s) 155 based on the set of workflows 140 (indicated in FIG. 1 by arrow 143B). In particular, the production system(s) 105 may generate validation test(s) 155 based on the workflows associated with a synthetic execution indicator 141A, 141C (e.g., Workflow A, Workflow C). For example, FIG. 1 illustrates that the validation test(s) 155 include validation testing criteria associated with Workflow A (e.g., Workflow A expected output(s) 165) and validation testing criteria associated with Workflow C (e.g., Workflow C expected output(s) 170), but the validation test(s) 155 omit validation testing criteria associated with Workflow B, in particular because Workflow B is not associated with a synthetic execution indicator and therefore is not indicated as requiring validation.

FIG. 1 also illustrates that the production system(s) 105 may generate the validation test(s) 155 based on the data 135 (indicated by arrow 137B). In some instances, the data 135 comprises implementation data for implementing the various workflows 140, such as configuration data obtained via user input defining parameters and/or settings associated with performance of the various workflows (e.g., configuration 240 from FIG. 2 for workflow 210 and Workflow A, configuration 280 for workflow 220 and Workflow C).

As illustrated in FIG. 1, the validation test(s) 155 may comprise expected outputs for the various workflows (Workflow A, Workflow C) associated with synthetic execution indicators (141A, 141C). For instance, Workflow A Expected Output(s) 165 and Workflow C Expected Output(s) 170 may be outputs that the production system(s) 105 would be expected to form as production transaction output 150 when executing Workflow A and Workflow C within the production environment 100 (e.g., according to dashed arrows 143A, 137A, and 113A, described hereinabove) and based on inputs generated from or based on organization-specific data 135 (configuration 240 from FIG. 2 for workflow 210 and Workflow A, configuration 280 for workflow 220 and Workflow C).

The expected outputs of the validation test(s) 155 noted above may be determined in various ways. By way of example, the workflows 140 available to the production system(s) 105 may be associated with various development and/or logic checks 160, which may comprise checks and/or tests associated with a deployment pipeline used for developing the instructions 130 associated with the workflows 140 at the functional level (e.g., prior to configuration and/or reconfiguration of the workflows 140 within the production environment 100).

For example, the development and/or logic checks 160 may be based on a library of preconfigured rules that govern the configuration or operation of the workflow steps of the workflows 140, such as business context rules related to the execution of workflow steps associated with CAPA reports, time off request forms, deviation reports, and/or other workflows. To illustrate, an example preconfigured rule may state that time off requests are only sent to immediate supervisors of requesting users for approval and cannot be sent to certain entities of an organization (e.g., chief officers or board members). Based on the library of preconfigured rules, development and/or logic checks 160 may comprise various methods for determining expected output based on synthetic or abstracted input, which the workflows 140 may be tested against in a development testing environment of a deployment pipeline in order to detect errors in the workflows 140 during development thereof at the functional level (e.g., prior to deployment at the production environment 100). As used herein, "synthetic input" or "abstracted input" refer to inputs that are generated or supplied for the purpose of testing functional aspects of a software program within a testing environment (e.g., during development of the software program and prior to deployment in a production environment) and that are independent of entity-specific data for any particular production environment (e.g., data 135 of production environment 100).

In some instances, the development and/or logic checks 160 are made available to the production system(s) 105, such that the production system(s) 105 may utilize the development and/or logic checks 160 to identify logical inconsistencies within the customer-configured workflows 140 and to form expected outputs of validation test(s) 155 (indicated by arrow 163). For example, the production system(s) 105 may generate expected outputs by dynamically tailoring the methods of the development and/or logic checks 160 to the particular organization-specific data 135 (e.g., by selecting from the methods based on the organization-specific configurations of the workflows 140 represented in the data 135 and compiling the methods into a logical order).

For instance, to determine Workflow A expected output(s) 165, the production system(s) 105 may utilize methods of the development and/or logic checks 160 associated with Workflow A (as configured after deployment into the production environment 100) while implementing keyword tags to organization-specific implementation data 135 (e.g., according configuration 240 of workflow 210 and Workflow A). For example, the production system(s) 105 may determine (based on organization-specific data 135) who the manager is for each particular department of the drop-down menu associated with workflow step 265 for identifying responsible entities, thereby predicting output that should result from input selecting the various departments pursuant to workflow step 265. In this way, the production system(s) 105 may use inputs to generate workflow A expected output(s) 165 that are specific to the organization associated with the production environment 100 (rather than synthetic or abstracted inputs as may have been done during functional development before deployment into the production environment 100).

The validation test(s) 155 may enable the production system(s) to determine whether the workflows 140 as configured by an organization or entity for and/or within the production environment 100 will function as intended within the production environment 100. For example, discrepancies between Workflow A expected output(s) 165 and output generated from actually executing Workflow A within the production environment 100 may indicate that Workflow A should not be considered validated. However, executing Workflow A under normal circumstances within the production environment 100 to detect such discrepancies may generate production transaction output 150, which may give rise to unintended real production consequences.

Accordingly, in some instances, the production system(s) 105 perform validation testing using synthetic executions of workflows within the production environment 100. In some implementations, the production system(s) 105 facilitate synthetic execution by initiating flagged session(s) 175 within the production environment. In some instances, the production system(s) 105 initiate the flagged session(s) 175 based on or in response to the synthetic execution indicators 141A, 141C, which, as described hereinabove, may comprise flags, interrupts, code variables, and/or other data elements that are operable to cause the production system(s) 105 to record execution output (e.g., synthetic execution output 185) within a synthetic data repository 180 and refrain from recording execution output (e.g., synthetic execution output 185) within production transaction data repositories 145. Thus, in some instances, the flagged session(s) 175 are therefore configured such that output generated from executions of workflows 140 during the session becomes segregated from real production data (e.g., stored in the one or more production transaction data repositories 145). In this way, executions performed during flagged session(s) 175 may be regarded as synthetic executions, resulting in no real production consequences.

FIG. 1 illustrates that during the flagged session(s) 175, the production system(s) 105 may utilize processor(s) 110 to synthetically execute Workflow A and Workflow C within the production environment 100 using inputs generated from organization-specific implementation data 135 (indicated by arrows 113B, 137C, and 143C). By way of example, when synthetically executing Workflow A associated with generating a CAPA report (see FIG. 2), the production system(s) may generate inputs for use during the synthetic executions based on the configuration 240 for Workflow A (and workflow 210).

For instance, the production system(s) 105 may synthetically execute workflow step 255 of obtaining an issue description multiple times with different inputs, and the different inputs may comprise each organization-specific department listed in the drop-down menu of departments (e.g., obtained via an active directory of the organization).

The production system(s) 105 may also utilize automatically generated text as part of the issue description. Similarly, the production system(s) 105 may synthetically execute workflow step 260 of obtaining an incident date based on different automatically generated date inputs. Furthermore, the production system(s) 105 may synthetically execute workflow step 265 of obtaining responsible entities using different inputs selected from the departments of the drop-down menu (while omitting individual/role input according to the configuration 240).

Those skilled in the art will appreciate, in view of the present disclosure, that the production system(s) 105 may generate input for synthetic executions based on data 135 in various ways, such as by importing organization/specific data structures, or by receiving user input responsive to a prompt for test inputs intended for use during synthetic executions.

Performing the synthetic executions according to the flagged session(s) 175 generates synthetic execution output 185, which the production system(s) 105 record (at least temporarily) within a synthetic execution data repository 180. The production system(s) 105 refrain from recording the synthetic execution output 185 within the production transaction data repositories 145 (indicated in FIG. 1 by dashed arrow 177 with an "X" thereover), thereby preventing the synthetic execution output 185 from causing real production consequences.

In some implementations, based on the synthetic execution output 185 stored within the synthetic execution data repository 180, the production system(s) 105 generate validation test report(s) 190. The validation test report(s) 190 may comprise a representation of at least a portion of the synthetic execution output 185. For example, the validation test report(s) 190 may comprise Workflow A results, which focus on discrepancies detected between the workflow A expected output(s) 165 and the portion of the synthetic execution output 185 generated by synthetically executing Workflow A using organization-specific data 135, and Workflow C results, which focus on discrepancies detected between Workflow C Expected Output(s) 170 and the portion of the synthetic execution output 185 generated by synthetically executing Workflow C using organization-specific data 135.

The validation test report(s) 190 may provide a consolidation of the workflows that were tested and provide objective evidence that the tests were performed (e.g., in the form of recordings, screenshots, etc.). FIG. 3 illustrates an example conceptual representation of a validation test report 300, which may correspond in at least some respects to the validation test report(s) 190 described above. For example, the validation test report 300 includes report 305 for CAPA report validation results, which may correspond to Workflow A results from the validation test report(s) 190. The validation test report 300 also includes report 310 for deviation report validation results, which may correspond to Workflow C results from the validation test report(s) 190.

FIG. 3 illustrates that the validation test report 300 calls attention to discrepancies detected during validation testing. For example, report 305 focuses on discrepancies 315 detected through validation testing of generating a CAPA report (e.g., according to Workflow A and workflow 210) based on a comparison of expected output 325 (e.g., corresponding to Workflow A expected output(s) 165 from FIG. 1) with actual output 330 (e.g., corresponding to at least a part of synthetic execution output 185). By way of example, report 305 indicates that for a drop-down menu input 320 of "Process Control" for identifying responsible entities (e.g., corresponding to workflow step 265 of FIG. 2), the expected output 325 is to transmit a message to a "Process Manager" such as "Jane Doe", "Janet Doe", or "Janice Doe" (e.g., according to organization-specific data 135). However, the actual output 330 resulting from synthetic executions using input 320 within the production environment 100 includes transmitting a message to "John Doe", who is a "Process Engineer". Notably, no actual message was transmitted to John Doe, in particular because of the synthetic nature of the executions for validation testing within the production environment 100 described above.

Report 305 also indicates that for a drop-down menu input 335 of "Environment Safety" for identifying responsible entities, the expected output 340 is to transmit a message to an "Impact Manager" such as "Jane Smith", "Janet Smith", or "Janice Smith". However, the actual output 345 resulting from synthetic executions using input 335 within the production environment 100 includes transmitting a message to "John Smith", who is a "Financial Manager". The ellipsis 350 indicates that a report for a particular workflow may comprise any additional and/or alternative components and/or data for presentation to a user (e.g., a quality manager).

FIG. 3 also illustrates, by way of example, that report 310 indicates that no discrepancies were found during validation testing of generating a deviation report (e.g., according to Workflow C and workflow 220). The ellipsis 355 indicates that a validation test report 300 may comprise any additional and/or alternative components and/or data for presentation to a user (e.g., a quality manager).

In some instances, the production system(s) 105 transmit the validation test report 300 to one or more user devices for display thereon (e.g., I/O interface(s) 115). For example, the validation test report 300 may be transmitted to a quality manager of an organization for review of the results represented on the validation test report 300. In some implementations, the validation test report 300 is displayed as part of an interactable user interface that is configured to receive user input responsive to the results of the validation test report 300. For example, FIG. 3 illustrates that report 305 and report 310 are associated with approve or reject prompts 360A and 360B, respectively, which allow a user to select whether to approve or reject each tested workflow (e.g., Workflow A, Workflow C) based on the results of the validation testing (e.g., based on the number and/or type of discrepancies represented in the validation test report 300).

In some instances, the production system(s) 105 respond to user input indicating unsuccessful validation of a tested workflow by refraining from enabling the tested workflow for execution within the production environment 100 by end users to cause real production consequences (e.g., to generate production transaction output 150). FIG. 3 illustrates an example in which a user has provided user input rejecting Workflow A for generating a CAPA report, according to approve or reject prompt 360A. Thus, the production system(s) 105 may then refrain from enabling Workflow A for normal execution within the production environment 100, providing users the opportunity to reconfigure aspects of Workflow A based on the discrepancies 315 identified in the validation test report 300.

In some instances, the production system(s) 105 respond to user input, indicating successful validation of a tested workflow, by enabling the workflow for execution within the production environment 100 by end users to cause real production consequences (e.g., to generate production transaction output 150). FIG. 3 illustrates an example in which a user has provided user input approving Workflow C for generating a deviation report, according to approve or reject prompt 360B. Thus, the production system(s) 105 may then enable Workflow C for normal execution within the production environment 100 to provide real production consequences.

In some instances, after generating and/or providing the validation test report(s) 190 for review, the production system(s) 105 delete the synthetic execution output 185 stored in the synthetic execution data repository 180 to free up space for subsequent validation testing.

Those skilled in the art will appreciate, in view of the present disclosure, that the production system(s) 105 described hereinabove may comprise or be in communication with any number of computing components and/or devices. For example, any of the components described hereinabove associated with the production system(s) 105 (processor(s) 110, I/O interface(s) 115, storage 125, transaction data repository 145, synthetic data repository 180, etc.) may comprise any combination of local components of a local computing system and/or remote components of one or more remote systems (e.g., accessed via network 195, such as a cloud network). Similarly, any information described hereinabove associated with the production system(s) 105 (e.g., instructions 130, data 135, validation test(s) 155, transaction output 150, synthetic execution output 185, validation test report(s) 190) may be stored in and/or accessed from any number of data repositories, which may be associated with any number of local and/or remote systems. In addition, in some instances, any processing and/or storage capability described hereinabove with reference to the production system(s) 105 may be at least partially distributed.

Furthermore, it will be appreciated, in view of the present disclosure, that the various components of the production system(s) 105 illustrated in FIG. 1 are illustrative only and non-limiting, and that production system(s) 105 may comprise fewer, additional, or alternative components. For example, at least a portion of the production system(s) 105 may omit I/O interface(s) 115 and/or may include and/or be in communication with additional components not illustrated in FIG. 1, such as sensors.

Figure 4:
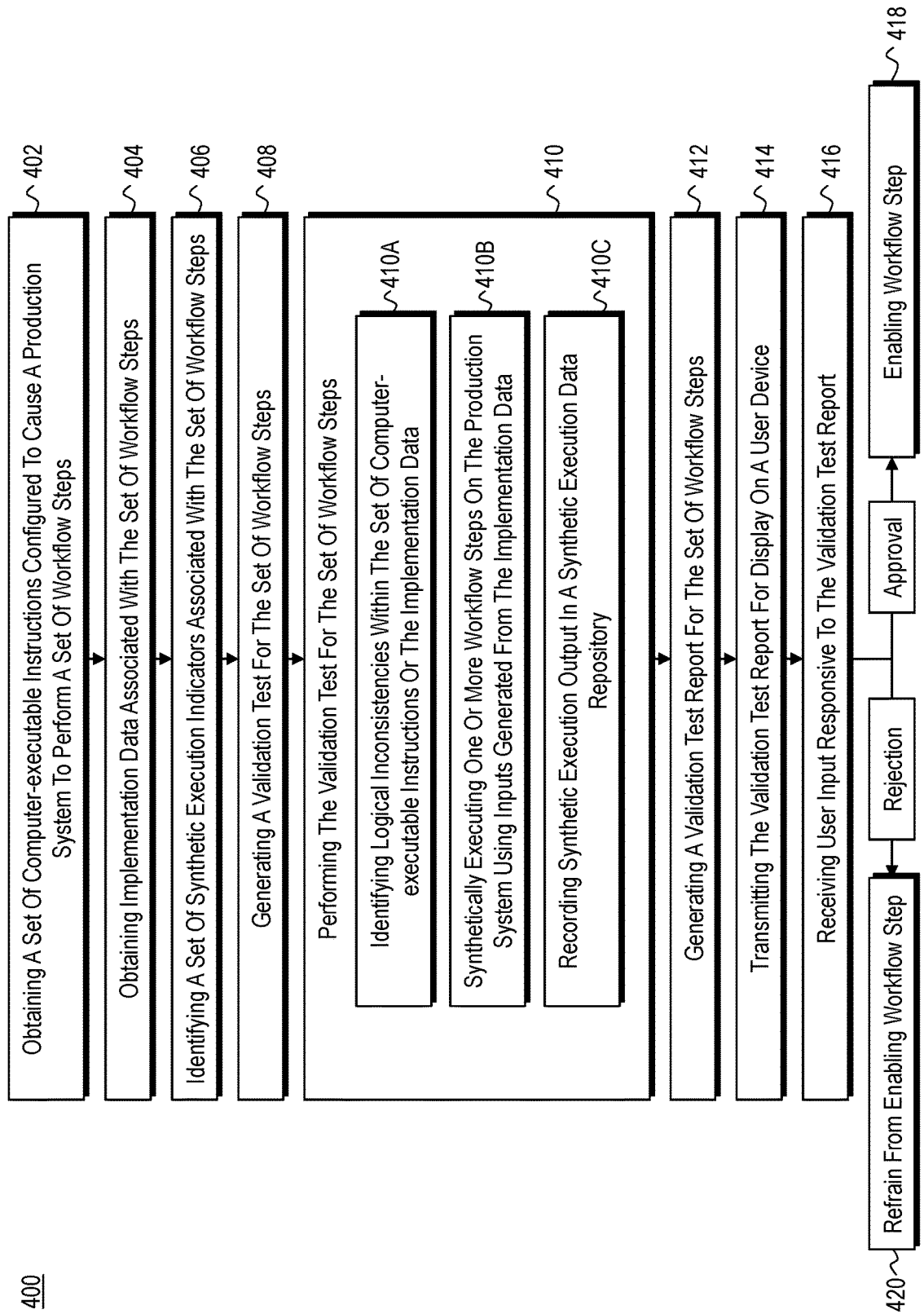
FIG. 4 illustrates an example flow diagram depicting various acts associated with facilitating software validation within a production environment.

Some implementations of the present disclosure can also be described in terms of acts (e.g., acts of a method) for accomplishing a particular result. Along these lines, FIG. 4 illustrates an example flow diagram 400 depicting various acts associated with facilitating software validation within a production environment. Although the acts shown in flow diagram 400 may be illustrated and/or discussed in a certain order, no particular ordering is required unless specifically stated or required because an act is dependent on another act being completed prior to the act being performed. Furthermore, it should be noted that not all acts represented in the flow diagrams are essential for facilitating software validation within a production environment.

In some instances, the acts of the flow diagrams are described below with reference to the systems, components, structures, and/or elements of FIGS. 1-3. For instance, at least some reference numerals included parenthetically hereinbelow refer, by way of illustrative example, to systems, components, structures, and/or elements described hereinabove with reference to FIGS. 1-3.

Act 402 of flow diagram 400 includes obtaining a set of computer-executable instructions (130) configured to cause production system (105) to perform a set of workflow steps (140). In some implementations, the set of computer-executable instructions (130) are operable, when executed within a production environment (100), to generate production transaction output (150) for storage on a production transaction data repository (145). In some instances, obtaining the set of computer-executable instructions (130) includes receiving user input (230A, 230B, 230C, 257, 263, 267) selecting at least one workflow step (Workflow A, Workflow B, Workflow C) for the set of workflow steps (140) associated with the set of computer-executable instructions (130).

Act 404 of flow diagram 400 includes obtaining implementation data (135) associated with the set of workflow steps (140). In some instances, the implementation data (135) comprises configuration data (240, 275, 280) for performing the set of workflow steps (140) within the production environment (100).

Act 406 of flow diagram 400 includes identifying a set of synthetic execution indicators (141A, 141C) associated with the set of workflow steps (140). In some instances, the set of synthetic execution indicators (141A, 141C) indicate one or more workflow steps (Workflow A, Workflow C) of the set of workflow steps (140) that require validation. Furthermore, in some instances, identifying the set of synthetic execution indicators (141A, 141C) includes receiving user input (235A, 235C) associating one or more synthetic execution indicators (141A, 141C) with the one or more workflow steps (Workflow A, Workflow C).

Act 408 of flow diagram 400 includes generating a validation test (155) for the set of workflow steps (140). In some instances, the validation test (155) is generated based on the implementation data (135), the set of synthetic execution indicators (141A, 141C), and the set of workflow steps (140). Furthermore, in some implementations, generating the validation test (155) includes generating validation testing criteria for each of the one or more workflow steps (Workflow A, Workflow C) indicated by the set of synthetic execution indicators (141A, 141C), and wherein the validation testing criteria comprise expected output (165, 170) from executing the one or more workflow steps (Workflow A, Workflow C) within production environment (100) based on input generated from the implementation data (135). Also, in some implementations, generating the validation test comprises refraining from generating validation testing criteria for each workflow step (Workflow B) of the set of workflow steps (140) that is not indicated by the set of synthetic execution indicators (141A, 141C) as requiring validation (e.g., according to prompt 235B). In addition, in some instances, the validation test (155) is at least partially based on one or more development checks (160) associated with a deployment pipeline for developing at least a portion of the set of computer-executable instructions (130).

Act 410 of flow diagram 400 includes performing the validation test (155) for the set of workflow steps (140). Performing the validation test (155) according to act 410 may be associated with various acts. For example, act 410A includes identifying logical inconsistencies within the set of computer-executable instructions (130) or the implementation data (135). Act 410B includes synthetically executing the one or more workflow steps (Workflow A, Workflow C) on the production system (105) using inputs generated from the implementation data (135). In some instances, synthetically executing the one or more workflow steps (Workflow A, Workflow C) includes prompting a user for inputs to use for synthetically executing the one or more workflow steps (Workflow A, Workflow C) of the set of workflow steps (140) on the production system. In some implementations, synthetically executing the one or more workflow steps (Workflow A, Workflow C) includes executing the one or more workflow steps (Workflow A, Workflow C) using the inputs generated from the implementation data (135) within a flagged session (175) of the production system (105) within the production environment (100).

Act 410C includes recording synthetic execution output (185) in a synthetic execution data repository (180). In some instances, act 410C includes refraining from recording the synthetic execution output (185) as production transaction output (150) on the production transaction data repository (145).

Act 412 of flow diagram 400 includes generating a validation test report (190, 300). In some instances, the validation test report (190, 300) includes a representation of at least a portion of the synthetic execution output (185) recorded in the synthetic execution data repository (180). Furthermore, in some instances, the validation test report identifies discrepancies (315) between the synthetic execution output (185) and expected output (165, 170). The expected output (165, 170) may be identified based on the set of workflows (140) and the implementation data (135).

Act 414 of flow diagram 400 includes transmitting the validation test report (190, 300) for display on a user device. Act 416 of flow diagram 400 includes receiving user input (360A, 360B) responsive to the validation test report (190, 300).

Flow diagram 400 illustrates that the user input (360A, 360B) may indicate approval (360B) or rejection (360A) of the one or more workflow steps (Workflow A, Workflow C). In response to approval, act 418 of flow diagram 400 includes enabling the at least one workflow step (Workflow C) for execution within the production environment (100) by an end user, thereby enabling the at least one workflow step (Workflow C) to be executed within the production environment (100) to cause real production consequences. In response to rejection, act 420 of flow diagram 400 includes refraining from enabling the at least one workflow step (Workflow A) for execution within the production environment (100) by an end user, thereby preventing the at least one workflow step (Workflow A) from being executed within the production environment (100) to cause real production consequences.

In some instances, after responding to the user input (360A, 360B) according to act 418 or act 420, the synthetic execution output (185) from the synthetic execution data repository (180) may be deleted.

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general purpose or special purpose computer system.

Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media (e.g., hardware storage devices) and transmission computer-readable media.

Physical computer-readable storage media includes hardware storage devices such as RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RANI and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Disclosed embodiments may comprise or utilize cloud computing. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, wearable devices, and the like. The invention may also be practiced in distributed system environments where multiple computer systems (e.g., local and remote systems), which are linked through a network (either by hardwired data links, wireless data links, or by a combination of hardwired and wireless data links), perform tasks. In a distributed system environment, program modules may be located in local and/or remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Application-specific Standard Products (ASSPs), System-on-a-chip systems (SOCs), Complex Programmable Logic Devices (CPLDs), central processing units (CPUs), graphics processing units (GPUs), and/or others.

As used herein, the terms "executable module," "executable component," "component," "module," or "engine" can refer to hardware processing units or to software objects, routines, or methods that may be executed on one or more computer systems. The different components, modules, engines, and services described herein may be implemented as objects or processors that execute on one or more computer systems (e.g. as separate threads).

Various alterations and/or modifications of the inventive features illustrated herein, and additional applications of the principles illustrated herein, which would occur to one skilled in the relevant art and having possession of this disclosure, can be made to the illustrated embodiments without departing from the spirit and scope of the invention as defined by the claims, and are to be considered within the scope of this disclosure. Thus, while various aspects and embodiments have been disclosed herein, other aspects and embodiments are contemplated. While a number of methods and components similar or equivalent to those described herein can be used to practice embodiments of the present disclosure, only certain components and methods are described herein.

It will also be appreciated that systems, devices, products, kits, methods, and/or processes, according to certain embodiments of the present disclosure may include, incorporate, or otherwise comprise properties, features (e.g., components, members, elements, parts, and/or portions) described in other embodiments disclosed and/or described herein. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

The present disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description. While certain embodiments and details have been included herein and in the attached disclosure for purposes of illustrating embodiments of the present disclosure, it will be apparent to those skilled in the art that various changes in the methods, products, devices, and apparatus disclosed herein may be made without departing from the scope of the disclosure or of the invention, which is defined in the appended claims. All changes which come within the meaning and range of equivalency of the claims are to be embraced within their scope.

What is claimed is:

1. A method for facilitating software validation within a production environment, the method comprising:
 causing a display of a workflow selection interface for selecting workflows for validation from a superset of available workflows, wherein the workflow selection interface comprises:
  a first selectable prompt for each workflow of the superset, wherein the first selectable prompt indicates workflows of the superset that are to be executed within the production environment;
  a second selectable prompt for each workflow of the superset, wherein the second selectable prompt indicates that a first set of workflows are to be executed within the production environment and do not need validation, and indicates that a second set of workflows require validation prior to enablement for execution by a production system,
  a configuration interface configured to indicate one or more selected workflow steps to include when executing the second set of workflows within the production environment, and
  a settings interface configured to establish implementation data for executing the one or more selected workflow steps within the production environment;
 obtaining a set of computer-executable instructions configured to cause the production system to perform the one or more selected workflow steps to generate production transaction output for storage on a production transaction data repository;
 obtaining the implementation data associated with the one or more selected workflow steps, wherein the implementation data comprises configuration data provided via user input at a user interface of the production system within the production environment that defines settings for execution of the one or more selected workflow steps on the production system in the production environment to generate production transaction output for storage on the production transaction data repository;
 identifying a set of synthetic execution indicators associated with the one or more selected workflow steps, the set of synthetic execution indicators indicating at least one workflow step of the one or more selected workflow steps that requires validation;
 generating a validation test based on the configuration data and the set of synthetic execution indicators; and
 performing the validation test for the at least one workflow step, wherein performing the validation test comprises:
  synthetically executing the one or more selected workflow steps on the production system using inputs generated using the configuration data;
  recording synthetic execution output generated by synthetically executing the at least one workflow step in a synthetic execution data repository; and
  refraining from recording the synthetic execution output as production transaction output on the production transaction data repository.

2. The method of claim 1, further comprising:
generating a validation test report comprising a representation of at least a portion of the synthetic execution output recorded in the synthetic execution data repository.

3. The method of claim 2, further comprising:
transmitting the validation test report for display on a user device;
receiving user input responsive to the validation test report; and
in response to determining that the user input indicates successful validation of the at least one workflow step, enabling the at least one workflow step for execution within the production environment by an end user.

4. The method of claim 2, further comprising:
transmitting the validation test report for display on a user device;
receiving user input responsive to the validation test report; and
in response to determining that the user input indicates unsuccessful validation of the at least one workflow step, refraining from enabling the at least one workflow step for execution within the production environment by an end user.

5. A production system for facilitating software validation within a production environment, comprising:
one or more processors; and
one or more hardware storage devices storing executable instructions that are operable, when executed by the one or more processors, to configure the production system to:
cause a display of a workflow selection interface for selecting workflows for validation from a superset of available workflows, wherein workflow selection interface comprises:
a first selectable prompt for each workflow of the superset, wherein the first selectable prompt indicates workflows of the superset that are to be executed within the production environment;
a second selectable prompt for each workflow of the superset, wherein the second selectable prompt indicates that a first set of workflows are to be executed within the production environment but do not need validation, and indicates that a second set of workflows require validation prior to enablement for execution by the production system,
a configuration interface configured to indicate one or more selected workflow steps to include when executing the second set of workflows within the production environment, and
a settings interface configured to establish implementation data for executing the one or more selected workflow steps within the production environment;
obtain a set of computer-executable instructions configured to cause the production system to perform the one or more selected workflow steps to generate production transaction output for storage on a production transaction data repository;
obtain the implementation data associated with the one or more selected workflow steps, wherein the implementation data comprises configuration data provided via user input at a user interface of the production system within the production environment that defines settings for execution of the one or more selected workflow steps on the production system in the production environment to generate production transaction output for storage on the production transaction data repository;
identify a set of synthetic execution indicators associated with the one or more selected workflow steps, the set of synthetic execution indicators indicating at least one workflow step of the one or more selected workflow steps that requires validation;
generate a validation test based on the configuration data and the set of synthetic execution indicators; and
perform the validation test for the at least one workflow step, wherein performing the validation test comprises:
synthetically executing the one or more selected workflow steps on the production system using inputs generated using the configuration data;
recording synthetic execution output generated by synthetically executing the at least one workflow step in a synthetic execution data repository; and
refraining from recording the synthetic execution output as production transaction output on the production transaction data repository.

6. The production system of claim 5, wherein identifying the set of synthetic execution indicators comprises receiving user input through the second selectable prompt.

7. The production system of claim 5, wherein generating the validation test comprises generating validation testing criteria for the at least one workflow step indicated by the set of synthetic execution indicators, and
wherein the validation testing criteria comprise expected output from executing the at least one workflow step within the production environment based on input generated using the configuration data.

8. The production system of claim 7, wherein generating the validation test comprises refraining from generating validation testing criteria for each workflow step of the one or more selected workflow steps that is not indicated by the set of synthetic execution indicators as requiring validation.

9. The production system of claim 5, wherein the validation test is at least partially based on one or more development checks associated with a deployment pipeline for developing at least a portion of the set of computer-executable instructions.

10. The production system of claim 5, wherein synthetically executing the at least one workflow step comprises executing the one or more selected workflow steps using the inputs generated using the configuration data within a flagged session of the production system within the production environment.

11. The production system of claim 5, wherein performing the validation test further comprises prompting a user to provide user input comprising input values to use for synthetically executing the at least one workflow step of the one or more selected workflow steps on the production system.

12. The production system of claim 5, wherein performing the validation test further comprises identifying logical inconsistencies within the settings for execution of the one or more selected workflow steps of the configuration data.

13. The production system of claim 5, wherein the executable instructions are further operable, when executed by the one or more processors, to configure the production system to:
generate a validation test report comprising a representation of at least a portion of the synthetic execution output recorded in the synthetic execution data repository.

14. The production system of claim 13, wherein the validation test report identifies discrepancies between the synthetic execution output and expected output, the expected output being identified based on the one or more selected workflow steps and the configuration data.

15. The production system of claim 13, wherein the executable instructions are further operable, when executed by the one or more processors, to configure the production system to:
transmit the validation test report for display on a user device;
receive user input responsive to the validation test report; and
in response to determining that the user input indicates successful validation of the at least one workflow step of the one or more selected workflow steps, enable the at least one workflow step for execution within the production environment by an end user.

16. The production system of claim 15, wherein the executable instructions are further operable, when executed by the one or more processors, to configure the production system to:
in response to determining that the user input indicates unsuccessful validation of the at least one workflow step, refrain from enabling the at least one workflow step for execution within the production environment by an end user.

17. The production system of claim 13, wherein the executable instructions are further operable, when executed by the one or more processors, to configure the production system to:
after generating the validation test report, delete the synthetic execution output from the synthetic execution data repository.

18. One or more hardware storage devices storing executable instructions that are operable, when executed by one or more processors, to configure a production system to facilitate software validation within a production environment by configuring the production system to:
cause a display of a workflow selection interface for selecting workflows from a superset of available workflows, wherein the workflow selection interface comprises:
a first selectable prompt for each workflow of the superset, wherein the first selectable prompt indicates workflows of the superset that are to be executed within the production environment;
a second selectable prompt for each workflow of the superset, wherein the second selectable prompt indicates that a first set of workflows are to be executed within the production environment and do not need validation, and indicates that a second set of workflows require validation prior to enablement for execution by the production system,
a configuration interface configured to indicate one or more selected workflow steps to include when executing the second set of workflows within the production environment, and
a settings interface configured to establish implementation data for executing the one or more selected workflow steps within the production environment;
obtain a set of computer-executable instructions configured to cause the production system to perform the one or more selected workflow steps to generate production transaction output for storage on a production transaction data repository;
obtain the implementation data associated with the one or more selected workflow steps, wherein the implementation data comprises configuration data provided via user input at a user interface of the production system within the production environment that defines settings for execution of the one or more selected workflow steps on the production system in the production environment to generate production transaction output for storage on the production transaction data repository;
identify a set of synthetic execution indicators associated with the one or more selected workflow steps, the set of synthetic execution indicators indicating at least one workflow step of the one or more selected workflow steps that requires validation;
generate a validation test based on the configuration data and the set of synthetic execution indicators; and
perform the validation test for the at least one workflow step, wherein performing the validation test comprises:
synthetically executing the one or more selected workflow steps on the production system using inputs generated using the configuration data;
recording synthetic execution output generated by synthetically executing the at least one workflow step in a synthetic execution data repository; and
refraining from recording the synthetic execution output as production transaction output on the production transaction data repository.

* * * * *